(12) United States Patent
Hattori

(10) Patent No.: US 8,595,215 B2
(45) Date of Patent: Nov. 26, 2013

(54) APPARATUS, METHOD, AND COMPUTER PROGRAM PRODUCT FOR PROCESSING QUERY

(75) Inventor: Masakazu Hattori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 995 days.

(21) Appl. No.: 12/047,743

(22) Filed: Mar. 13, 2008

(65) Prior Publication Data

US 2008/0235193 A1    Sep. 25, 2008

(30) Foreign Application Priority Data

Mar. 22, 2007    (JP) ................................ 2007-074813

(51) Int. Cl.
*G06F 17/30*    (2006.01)

(52) U.S. Cl.
USPC ............................ 707/716; 707/718; 707/719

(58) Field of Classification Search
USPC ......................................... 707/716, 718, 719
See application file for complete search history.

(56) References Cited

U.S. PATENT DOCUMENTS

| | | | | |
|---|---|---|---|---|
| 5,956,706 | A * | 9/1999 | Carey et al. ........................... | 1/1 |
| 6,665,663 | B2 * | 12/2003 | Lindsay et al. ....................... | 1/1 |
| 6,785,673 | B1 * | 8/2004 | Fernandez et al. ...... | 707/999.003 |
| 6,915,290 | B2 * | 7/2005 | Bestgen et al. ....................... | 1/1 |
| 7,054,854 | B1 | 5/2006 | Hattori et al. | |
| 7,120,864 | B2 * | 10/2006 | Cai et al. ........................ | 715/234 |
| 7,165,063 | B2 * | 1/2007 | Beyer et al. ............ | 707/999.003 |
| 7,386,541 | B2 * | 6/2008 | Pal et al. ................ | 707/999.001 |
| 7,457,810 | B2 * | 11/2008 | Breining et al. ........ | 707/999.101 |
| 2002/0188600 | A1 * | 12/2002 | Lindsay et al. .................... | 707/3 |
| 2003/0101169 | A1 * | 5/2003 | Bhatt et al. ........................ | 707/3 |
| 2004/0006561 | A1 * | 1/2004 | Nica ................................. | 707/3 |
| 2005/0108209 | A1 * | 5/2005 | Beyer et al. ....................... | 707/3 |
| 2005/0166140 | A1 * | 7/2005 | Cai et al. ........................ | 715/513 |
| 2005/0210002 | A1 * | 9/2005 | Pal et al. ........................... | 707/3 |
| 2007/0067274 | A1 * | 3/2007 | Han et al. ........................... | 707/4 |
| 2007/0174241 | A1 * | 7/2007 | Beyer et al. ....................... | 707/3 |
| 2008/0222087 | A1 * | 9/2008 | Balmin et al. ..................... | 707/2 |

FOREIGN PATENT DOCUMENTS

| | | |
|---|---|---|
| JP | 2000-057163 | 2/2000 |
| JP | 2001-034618 | 2/2001 |
| JP | 2001-147933 | 5/2001 |
| JP | 2008-083992 | 4/2008 |

OTHER PUBLICATIONS

Masakazu Hattori, et al.; Retrieval Optimization Technique Using A Query Graph in XML Database, Journal of Information Processing Society of Japan, the Information Processing Society of Japan, Dec. 15, 2002, vol. 43, No. SIG12, pp. 1-15, (TOD16).

(Continued)

*Primary Examiner* — Debbie Le
(74) *Attorney, Agent, or Firm* — Turocy & Watson, LLP

(57) ABSTRACT

A plan combining unit combines a plan including all predicate nodes by increasing a size of a subplan stepwise while selecting the subplan with a low cost using an analysis graph generated by a query analyzing unit and plan combination constraint data extracted by a constraint extracting unit. The analysis graph is the one expressed by a graph including a variable node corresponding to a variable to which an object on a database is bound and a predicate node indicating a condition between the variable nodes. The plan combination constraint data represents a constraint to a plan and a subplan extracted from the analysis graph as a condition between the nodes.

10 Claims, 16 Drawing Sheets

(56) References Cited

OTHER PUBLICATIONS

Hitoshi Tanigawa, et al.; TX1 XML Database Realizing High-Speed Searches in Large-Scale Environments, Toshiba Review, Japan, Toshiba Corporation, Jul. 1, 2005, vol. 60, No. 7, pp. 71-75.

Masakazu Hattori, et al.; Structure Coding based Light-Weight XML Database -Design and Implementation-, Transactions of the 19th Data Engineering Workshop [online], Japan, Proceedings of Data Engineering Workshop of the Institute of Electronics, Information and Communication Engineers, Apr. 7, 2008, DEWS2008 C8-5.

Chen Z, et al.; From tree patterns to generalized tree patterns: on efficient evaluation of XQuery, Very Large Database Endowment, Proceedings of the 29th international conference on Very large data bases, 2003, vol. 29, pp. 237-248.

Japanese Office Action dated Dec. 7, 2010 corresponding to U.S. Appl. No. 12/047,743, filed Mar. 13, 2008.

\* cited by examiner

FIG.3

```
<ROOT>
 <BOOK>
   <TITLE>XML</TITLE>
   <KEYWORD>XML</KEYWORD>
 </BOOK>
 <BOOK>
   <TITLE>DB</TITLE>
   <RELATED INFORMATION>
     <KEYWORD>XML DATABASE</KEYWORD>
     <KEYWORD>DB</KEYWORD>
   </RELATED INFORMATION>
 </BOOK>
 <BOOK>
   <BODY>XML DATABASE</BODY>
 </BOOK>
 <BOOK>
   <TITLE>SGML</TITLE>
   <BODY>DATABASE</BODY>
 </BOOK>
</ROOT>
```

```
for $book in/BOOK
let $title:=$book/TITLE[.="XML"]
return
  <RESULT TITLE="{$title}">{$book}</RESULT>
```

COMBINATION
CONSTRAINT A

ADD FOLLOWING CONSTRAINT
(1) PREDICATE NODE 11 CAN BE PROCESSED AFTER PROCESSING PREDICATE NODE 10 THAT INCARNATES VARIABLE NODE 2.

FIG.14

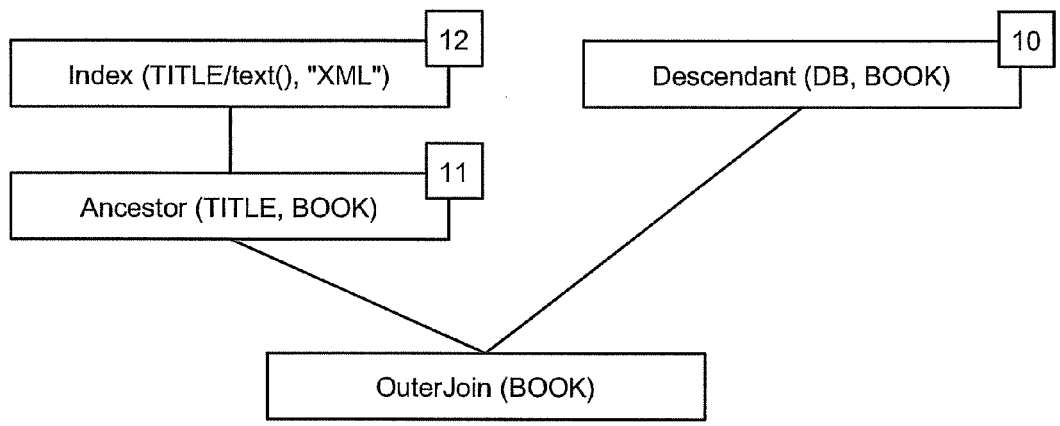

FIG.15

```
<RESULT TITLE="XML">
  <BOOK>
    <TITLE>XML</TITLE>
    <KEYWORD>XML</KEYWORD>
  </BOOK>
</RESULT>
<RESULT TITLE="DB">
  <BOOK>
    <TITLE>DB</TITLE>
    <RELATED INFORMATION>
      <KEYWORD>XML DATABASE</KEYWORD>
      <KEYWORD>DB</KEYWORD>
    </RELATED INFORMATION>
  </BOOK>
</RESULT>
<RESULT TITLE="">
  <BOOK>
    <BODY>XML DATABASE</BODY>
  </BOOK>
</RESULT>
<RESULT TITLE="">
  <BOOK>
    <TITLE>SGML</TITLE>
    <BODY>DATABASE</BODY>
  </BOOK>
</RESULT>
```

```
for $book in/BOOK
for $title in $book/TITLE
where $title="XML"
            or
        $book//.="XML DATABASE"
return
        <RESULT TITLE="{$title}">{$book}</RESULT>
```

```
START
CONSTRAINT
      ADD FOLLOWING CONSTRAINT
      (1) 14 IS INVALID.

COMBINATION
CONSTRAINT A
      ADD FOLLOWING CONSTRAINTS
      (1) 11 IS ONLY PREDICATE NODE THAT CAN BE ADDED TO OR/AND
      PROCESS SUBPLAN INCLUDING 13.
      (2) 11 IS ONLY PREDICATE NODE THAT CAN BE ADDED TO OR/AND
      PROCESS SUBPLAN INCLUDING 12 AND 14.
```

```
<RESULT TITLE="XML">
  <BOOK>
    <TITLE>XML</TITLE>
    <KEYWORD>XML</KEYWORD>
  </BOOK>
</RESULT>
<RESULT TITLE="DB">
  <BOOK>
    <TITLE>DB</TITLE>
    <RELATED INFORMATION>
      <KEYWORD>XML DATABASE</KEYWORD>
      <KEYWORD>DB</KEYWORD>
    </RELATED INFORMATION>
  </BOOK>
</RESULT>
<RESULT TITLE="">
  <BOOK>
    <BODY>XML DATABASE</BODY>
  </BOOK>
</RESULT>
```

FIG.22

```
<RESULT TITLE="XML">
  <BOOK>
    <TITLE>XML</TITLE>
    <KEYWORD>XML</KEYWORD>
  </BOOK>
</RESULT>
<RESULT TITLE="DB">
  <BOOK>
    <TITLE>DB</TITLE>
    <RELATED INFORMATION>
      <KEYWORD>XML DATABASE</KEYWORD>
      <KEYWORD>DB</KEYWORD>
    </RELATED INFORMATION>
  </BOOK>
</RESULT>
<RESULT TITLE="">
  <BOOK>
    <BODY>XML DATABASE</BODY>
  </BOOK>
</RESULT>
```

APPARATUS, METHOD, AND COMPUTER PROGRAM PRODUCT FOR PROCESSING QUERY

CROSS-REFERENCE TO RELATED APPLICATIONS

This application is based upon and claims the benefit of priority from the prior Japanese Patent Application No. 2007-074813, filed on Mar. 22, 2007; the entire contents of which are incorporated herein by reference.

BACKGROUND OF THE INVENTION

1. Field of the Invention

The present invention relates to an apparatus, a method, and a computer program product for processing a query for a database in which structured document data that is represented by tree-structured nodes is stored.

2. Description of the Related Art

There are several schemes for a structured-document management system for storing and retrieving structured-document data that is described in eXtensible Markup Language (XML) or the like.

In recent years, a system has been proposed as a new storing method, in which the structured-document data in a native form. With this system, because the XML data (structured-document data) having a wide variety of hierarchical structures is stored without performing a special mapping process, there is a merit that a special overhead does not exist at the time of storing and acquiring the data. Furthermore, because a preliminary schema design that requires a high cost is not necessary, a structure of the XML data can be freely changed according to a change of a business environment as appropriate.

As a query language for retrieving the XML data, the XML query language (XQuery) has been developed. The XQuery is a language for handling the XML data just like a database. Therefore, it is provided with a means for extracting, collecting, and analyzing a data set satisfying a condition. Moreover, because the XML data has a hierarchical structure in which elements such as parent-child relation and sibling relation are combined, a means for tracing the hierarchical structure is provided. A technology for retrieving the structured-document data in which a specific element and a specific structure designated by a retrieving condition while tracing the hierarchical structure of stored structured-document data is already disclosed in JP-A 2000-057163 (KOKAI).

However, it takes more time to perform a process of tracing the elements constituting the hierarchical structure of each structured-document data as a size of the structure of the structured-document data grows, as the number of the structured-document data stored in the database increases, and as the retrieving condition becomes complicated. In addition, if the size and the number of the structured-document data increases, it is impossible to load the stored structured-document data on a memory, resulting in a majority of the data being stored in a secondary storage device such as a hard disk.

In the system that manages the structured-document data in the native form described above, because the hierarchical structure of the structured-document data between the elements is stored as it is, an access must be made at frequent intervals between the elements of the structured-document data stored in the secondary storage device in order to check whether there is an element or a structure that is designated as a retrieving condition. The situation is even stricter if the retrieving condition is complicated. Namely, in the system that manages the structured-document data in the native form, it is difficult to increase the speed of the retrieving process as the size of the structure of the structured-document data grows, as the number of the structured-document data stored in the database increases, and as the retrieving condition becomes complicated.

In recent years, a query optimization technology has been developed for increasing the speed of the query with a complicated retrieving condition.

A query optimization technology disclosed in Japanese Patent No. 3754253 stores a class of an applicable retrieving graph node, an application cost, an application condition, and a plan generation rule that indicates an action executed at the time of executing a retrieving plan, generates a retrieving graph having a retrieving graph node including a variable node that can be incarnated by the plan generation rule by parsing a description of a retrieving request, applies the plan generation rule by selecting a retrieving graph node that satisfies the application condition in the retrieving graph node of the retrieving graph and that requires the minimum application cost, and generates a retrieving plan that indicates a retrieving process procedure for a structured-document database by repeating the application of the plan generation rule while incarnating the variable node by executing the action. With this technology, it is possible to generate the plan at a high speed because the plan generation rule can be applied linearly.

A query optimization technology disclosed in Japanese Patent No. 3492246, when retrieving a portion that satisfies a designated condition from the XML data, seeks to optimize the query before executing a retrieving, and at the same time, seeks to optimize an execution by performing a replacement of the process procedure and a reuse of an obtained process result at the time of executing the retrieving, for example, performing a rewriting, such as a replacement of an inner loop and an outer loop in the case of running a nested loop, replacement of a right-hand member and a left-hand member when processing a self-join, and a replacement of an execution order. With this technology, it is possible to generate the plan at a high speed because the plan generation rule can be applied linearly, although it is inferior to the system disclosed in Japanese Patent No. 3754253.

However, it cannot be said that the query optimization technologies disclosed in Japanese Patent Nos. 3754253 and 3492246 are perfected, and there still exist several problems that must be solved.

The first problem of the query optimization technology disclosed in Japanese Patent No. 3754253 is that it is necessary to clarify a number of plan generation rules in advance. The second problem is that it is necessary to perform a considerable tuning in order to appropriately control an application order of a number of rules because there is a possibility of an occurrence of an interference. The third problem is that an accuracy of the plan (i.e., a cost) is not adequate, although the plan can be generated at the high speed.

The first problem of the query optimization technology disclosed in Japanese Patent No. 3492246 is that it is necessary to clarify a number of plan generation rules in advance. The second problem is that an accuracy of the plan (i.e., a cost) is not adequate.

In other words, with the query optimization technologies disclosed in Japanese Patent Nos. 3754253 and 3492246, it is necessary to exhaustively generate background knowledge in advance, such as a number of plan generation rules and a plan change rule, in order to optimize the query. However, because the XQuery language specification has following characteristics, it is anticipated that the above background knowledge increases so that the optimization becomes difficult: a nesting that causes a sequence (let expression); and a path designating a hierarchical condition between the elements of the XML data (such as/and //).

SUMMARY OF THE INVENTION

According to one aspect of the present invention, a query processing apparatus includes a query receiving unit that receives query data used for delivering a command to extract structured-document data that satisfies a predetermined condition with respect to a database that stores the structured-document data represented by tree-structured nodes; a query analyzing unit that parses the query data, and generates an analysis graph that includes variable nodes corresponding to a variable to which an object on the database is bound and a predicate node indicating a condition between the variable nodes; a constraint extracting unit that extracts a plan combination constraint data representing from the analysis graph, as a condition between the nodes, a constraint with respect to a plan that is a procedure of processing the query data and a subplan corresponding to the predicate node of the plan; a plan combining unit that processes a combination of the plan including all predicate nodes by increasing a size of the subplan stepwise while selecting a subplan with a low cost, using the analysis graph and the plan combination constraint data; and a plan executing unit that generates the structured-document data satisfying the query data by executing the plan.

According to another aspect of the present invention, a query processing method includes receiving query data used for delivering a command to extract structured-document data that satisfies a predetermined condition with respect to a database that stores the structured-document data represented by tree-structured nodes; parsing the query data, and generating an analysis graph that includes variable nodes corresponding to a variable to which an object on the database is bound and a predicate node indicating a condition between the variable nodes; extracting a plan combination constraint data representing from the analysis graph, as a condition between the nodes, a constraint with respect to a plan that is a procedure of processing the query data and a subplan corresponding to the predicate node of the plan; processing a combination of the plan including all predicate nodes by increasing a size of the subplan stepwise while selecting a subplan with a low cost, using the analysis graph and the plan combination constraint data; and generating the structured-document data satisfying the query data by executing the plan.

A computer program product according to still another aspect of the present invention causes a computer to perform the method according to the present invention.

BRIEF DESCRIPTION OF THE DRAWINGS

FIG. 3 is a schematic diagram for explaining an example of XML data;

FIG. 14 is a schematic diagram for explaining an example of a plan;

FIG. 15 is a schematic diagram for explaining the XML data obtained by executing the plan shown in FIG. 14;

FIG. 22 is a schematic diagram for explaining the XML data obtained by executing the plan shown in FIG. 21.

DETAILED DESCRIPTION OF THE INVENTION

Exemplary embodiments of the present invention are explained in detail below with reference to the accompanying drawings.

Figure 1:
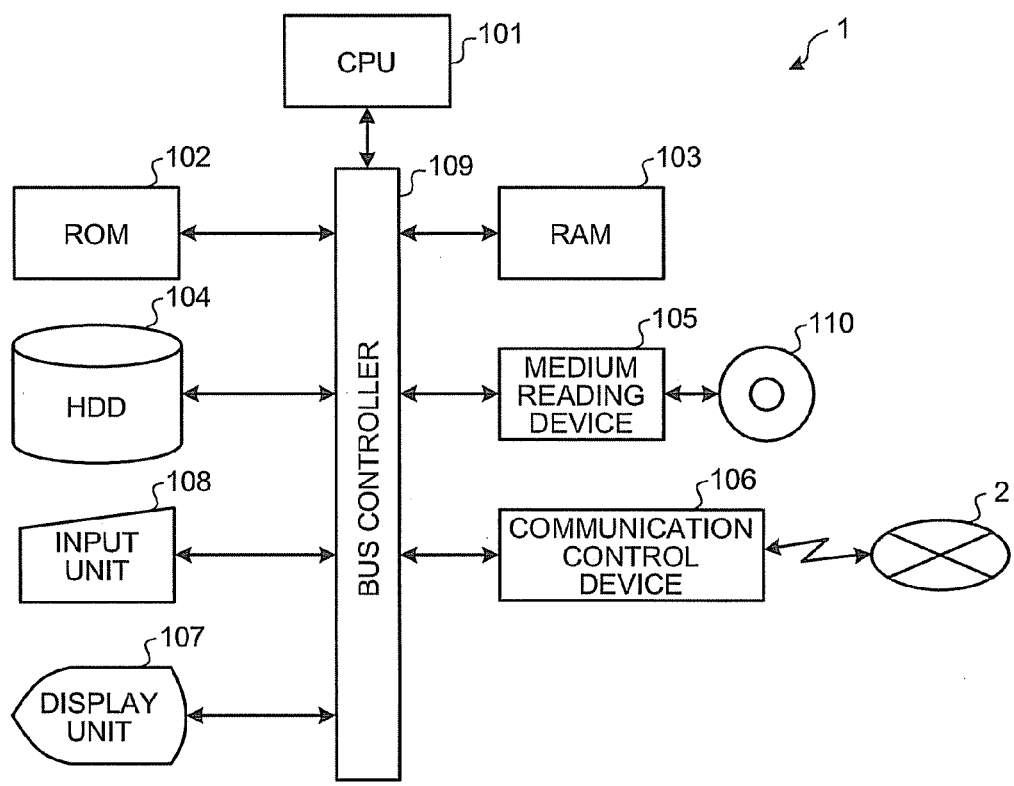
FIG. 1 is a schematic diagram of a module configuration of a query processing apparatus according to a first embodiment of the present invention.

FIG. 1 is a schematic diagram of a module configuration of a query processing apparatus 1 according to a first embodiment of the present invention. The query processing apparatus 1 is, for example, a common personal computer (PC).

As shown in FIG. 1, the query processing apparatus 1 is configured with a central processing unit (CPU) 101 that performs an information processing, a read only memory (ROM) 102 that stores therein a BIOS and the like, a random access memory (RAM) 103 that stores therein various data in a rewritable manner, a hard disk drive (HDD) 104 that stores various programs in a hard disk that functions as various database, a medium reading device 105 such as a CD-ROM drive that stores information, distributes information to the outside, and acquiring information from the outside using a storage medium 110, a communication control device 106 that exchanges information with other external computers by a communication via a network 2, a display unit 107 such as a cathode ray tube (CRT) and a liquid crystal display (LCD) that displays a progress and a result of a process to a user, and an input unit 108 such as a keyboard and a mouse used by the user for inputting a command and various pieces of information to the CPU 101. The data exchanged between the above devices and units is controlled by a bus controller 109.

In the query processing apparatus 1 described above, upon the user activating the apparatus, the CPU 101 starts a program called a loader that is stored in the ROM 102, loads a program called an operating system (OS) that manages a hardware and a software on a computer on the RAM 103 from the HDD 104, and starts the OS. The OS starts a program, reads information, and stores information in response to an operation of the user. A representative example of the OS is the Windows (Registered Trademark). A program running on the OS is called an application program. The application program is not limited to a program running on a predetermined OS, but can be a program that allows a part of various processes to be executed by the OS and a program that is included as a part of a program file group constituting a predetermined application software, the OS, and the like.

The query processing apparatus 1 stores a query processing program in the HDD 104 as the application program. In this sense, the HDD 104 functions as a storage medium that stores therein the query processing program.

In general, the application program to be installed in the HDD 104 of the query processing apparatus 1 is stored in the storage medium 110 that includes various types of recording media, such as an optical disk including a CD-ROM and a digital versatile disk (DVD), various types of optical-magnetic disks, various types of magnetic disks including a flexible disk (FD), and a semiconductor memory. The operation program stored in the storage medium 110 is then installed in the HDD 104. Therefore, the storage medium 110 having a portability, such as the optical information recording medium including the CD-ROM and the magnetic recording medium including the FD can be a storage medium that stores therein the application program. Furthermore, the application program can be imported from the outside via the communication control device 106, and installed in the HDD 104.

When the query processing program running on the OS is started, the CPU 101 executes various arithmetic and logical operation processes following the query processing program and controls each of the devices and units. From among the various operation processes that are executed by the CPU 101, feature processes of the present embodiment are explained below.

Figure 2:
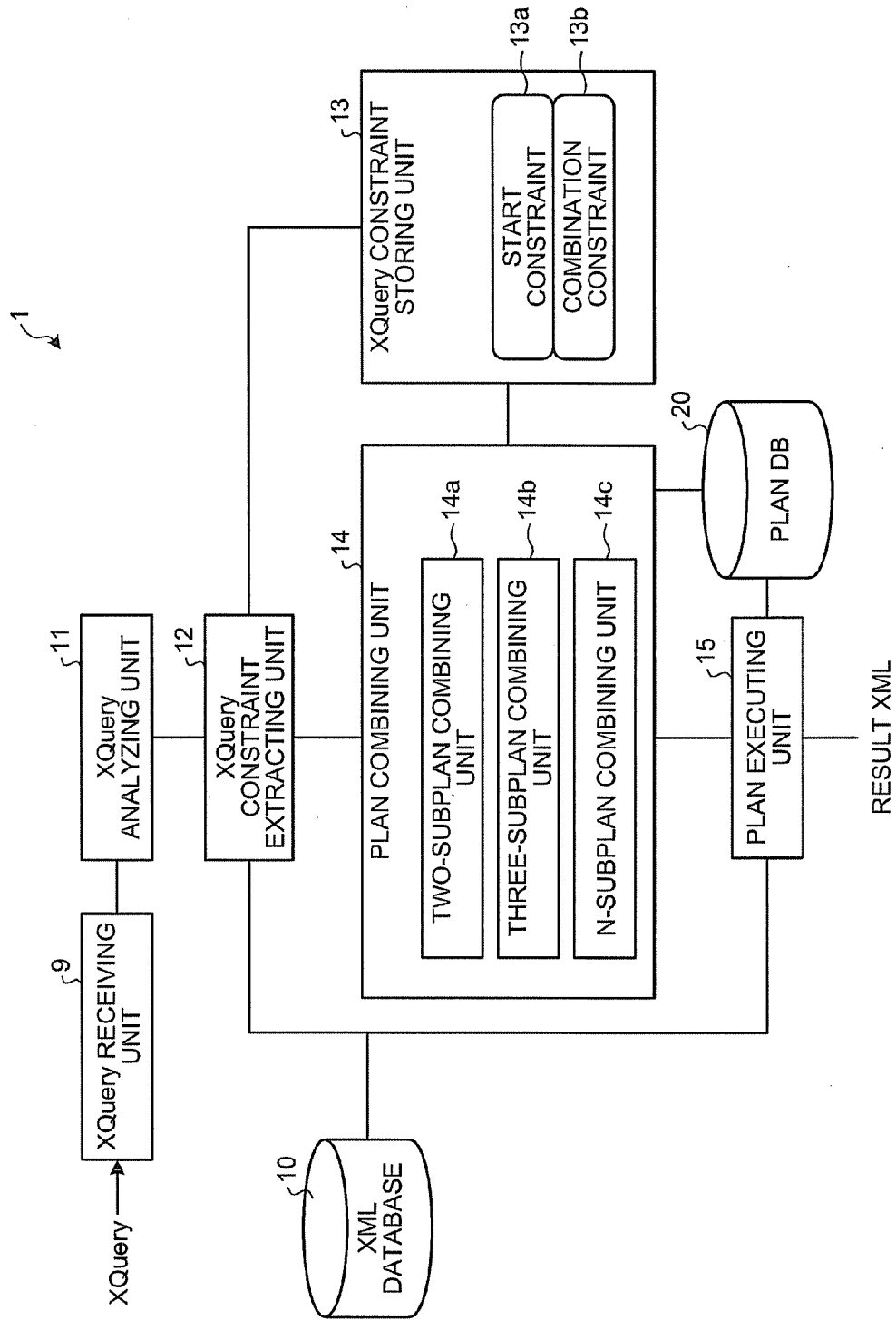
FIG. 2 is a block diagram for explaining an outline of the query processing apparatus.

FIG. 2 is a block diagram for explaining an outline of the query processing apparatus 1. As shown in FIG. 2, the query processing apparatus 1 builds an XML database 10 that stores therein XML data that is structured-document data having a hierarchical structure in the HDD 104 following the query processing program. The query processing apparatus 1 includes an XQuery receiving unit 9, an XQuery analyzing unit 11, an XQuery constraint extracting unit 12, an XQuery constraint storing unit 13, a plan combining unit 14, and a plan executing unit 15. With this configuration, the query processing apparatus 1 receives XQuery data that is input from a user or an external system, and generates XML data that satisfies the received XQuery data by referring to the XML database 10.

FIG. 3 is a schematic diagram for explaining an example of the XML data stored in the XML database 10. In the XML, an individual part constituting a document structure is called an "element". The element is described using a tag. Specifically, a single element is expressed by enclosing data with a tag indicating a start of an element (a start tag) and a tag indicating an end of the element (an end tag). The text data enclosed by the start tag and the end tag is a text element (a text node) included in a single element that is represented by the start tag and the end tag.

In the example shown in FIG. 3, there is a root element that is an element enclosed by <ROOT> and </ROOT> tags. There are four <BOOK> elements just below the <ROOT> element, and there are a <KEYWORD> element, a <TITLE> element, and a <RELATED INFORMATION> element just below the <BOOK> elements. There is a <KEYWORD> element just below the <RELATED INFORMATION> element. The document structures of the four <BOOK> elements are different from each other, including occurring element and non-occurring element, respectively.

Figure 4:
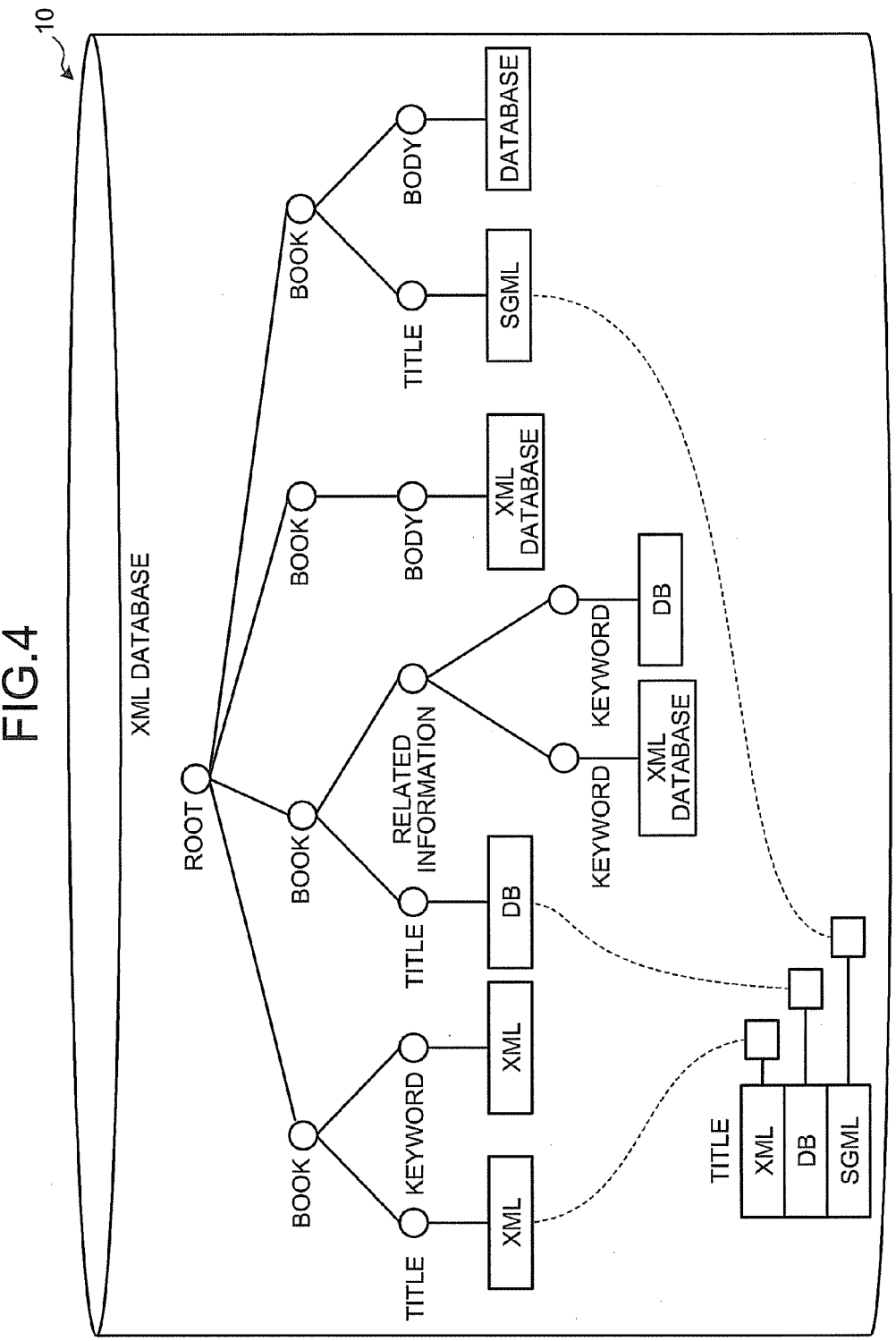
FIG. 4 is a schematic diagram for explaining a storage image of the XML data shown in FIG. 3.

FIG. 4 is a schematic diagram for explaining a storage image of the XML data shown in FIG. 3 in the XML database 10.

Although the XML database 10 is stored in the HDD 104 in the present embodiment, it can be resident in a memory.

As shown in FIG. 4, the XML data is expressed by an object and a link in a format similar to a document object mode (DOM). There are four <BOOK> elements just below the <ROOT> element, which are connected by a link indicating the parent-child relation. There is a text object indicating text data at the bottom layer of the object.

Furthermore, an index about the text data is attached at the bottom left of FIG. 4. When storing the XML data in the XML database 10, it is possible to attach a text index to an element that is designated in advance. In this example, the text index is attached to the texts just below the <TITLE> elements. There is a content table in which the keywords such as "XML", "DB", and "SGML" are stored, and index links (broken lines) are drawn to the text objects from which these keywords occur.

An explanation is given below for the XQuery. The XQuery, which is a query language used for delivering a command to extract XML data that satisfies a predetermined condition with respect to the XML database 10, can be explained with a syntax pattern of FLWR (for-let-where-return). The language specification of the XQuery is explained below from a viewpoint of a procedure.

The syntax of a "for" clause is "for VARIABLE in EXPRESSION". The syntax of the "for" clause has a meaning of assigning the one satisfying the expression to the variable and performing a loop.

The syntax of a "let" clause is "let VARIABLE EXPRESSION". The syntax of the "let" clause has a meaning of collecting the ones satisfying the expression and assigning them as a sequence to the variable. The sequence is a flat list.

A "where" clause limits a loop that is repeated by "F". The syntax of the "where" clause is "where EXPRESSION". The syntax of the "where" clause has a meaning of running the one satisfying the expression in a loop and skipping the loop for the others not satisfying the expression.

A "return" clause formats a result obtained by processing the XQuery. The syntax of the "return" clause is "return EXPRESSION". The syntax of the "return" clause can describe arbitrary XML data including a variable.

The syntax of the variable is "$ character string". Variables having the same character string are considered as the same except for a case in which a variable is declared in a duplicated manner in a nested query and the like.

As an operator designating a hierarchical condition between the elements of the XML data, the XQuery has followings.

"/" an operator indicating a parent-child relation between the elements

Figures 5, 6:
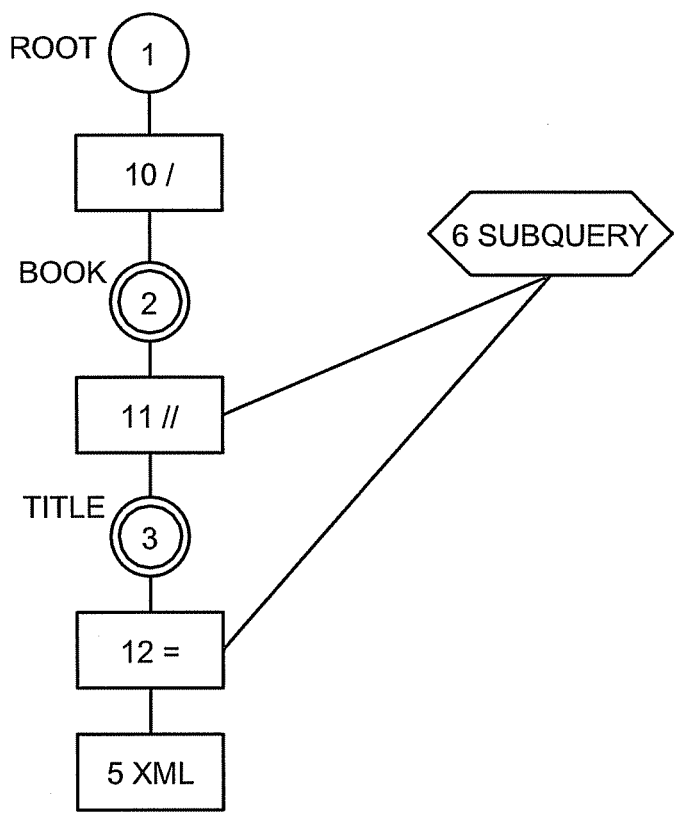
FIG. 5 is a schematic diagram for explaining an example of XQuery data.
FIG. 6 is a schematic diagram for explaining an XQuery analysis graph generated based on the XQuery data shown in FIG. 5.

"//" an operator indicating a grandparent-grandchild relation between the elements "•" an arbitrary element FIG. 5 is a schematic diagram for explaining an example of the XQuery data. The XQuery data shown in FIG. 5 indicates a request to collect the ones having a title "XML" ($title) for a book just below the root of the XML database ($book) and to make a list by enclosing the XML data in which a text of the title and all <BOOK> elements are loaded with a <RESULT> element.

Each of the units constituting a query processing function of the query processing apparatus 1 shown in FIG. 2 is explained below.

The XQuery receiving unit 9 receives XQuery data input from a user or an external system.

The XQuery analyzing unit 11 parses the XQuery data received by the XQuery receiving unit 9, and generates an XQuery analysis graph. The XQuery analysis graph can be generated mechanically using a parsing tool such as a yet another complier compiler (Yacc). FIG. 6 is a schematic diagram for explaining the XQuery analysis graph generated based on the XQuery data shown in FIG. 5. As shown in FIG. 6, the XQuery analysis graph expresses a condition constituting the XQuery data by a graph. The condition constituting the XQuery data shown in FIG. 5 is as follows.

a condition about a hierarchy between the elements of the XML data
        There is a book element just below a root element (/).
        There is a title element at a grandchild (//) of the book element.
        There is a text element just below the title element (/)
    a condition about a text of the XML data
        The text just below the title element is equal to "XML" (=).
    information on a "let" clause and a "where" clause
        A book in which the text just below the title element is equal to "XML" is a nesting.

A node corresponding to a variable to which an object on the XML database 10 is bound is called a variable node (indicated by a circle in FIG. 6). A variable node corresponding to a variable "$ character string" explicitly declared in the XQuery data is called an axis node (indicated by a double circle in FIG. 6). A condition for between the variable nodes is called an XQuery analysis graph predicate (hereinafter, "a predicate node") (indicated by a square in FIG. 6). Information indicating a "let" clause of a "where" clause is called an XQuery analysis graph meta node (hereinafter, "a meta node") (indicated by a rhombus in FIG. 6).

The XQuery constraint extracting unit 12 scans the XQuery analysis graph generated by the XQuery analyzing unit 11, extracts plan combination constraint data on combining a plan, and updates the XQuery constraint storing unit 13. Details on a constraint data extracting process performed by the XQuery constraint extracting unit 12 will be explained later.

The plan combining unit 14 generates a plan for generating XML data satisfying XQuery data of a request using the XQuery analysis graph and the plan combination constraint data stored in the XQuery constraint storing unit 13. The plan is configured with a sequence of various operators executing an access operation to the XML database 10 and an operation on a memory. The plan combining unit 14 includes a subplan combining unit that is an arbitrary number of subplan combining means to generate a new subplan by combining an arbitrary number of subplans. In other words, the plan combining unit 14 includes a two-subplan combining unit 14a, a three-subplan combining unit 14b, and an N-subplan combining unit 14c. The subplan means a sequence of partial operators that constitutes the plan. The two-subplan combining unit 14a generates a new subplan by combining two subplans. The three-subplan combining unit 14b generates a new subplan by combining three subplans. The N-subplan combining unit 14c generates a new subplan by combining an arbitrary number (N) of subplans.

The plan executing unit 15 generates the XML data satisfying the XQuery data of the request as the result XML data by executing the plan generated by the plan combining unit 14.

Figure 7:
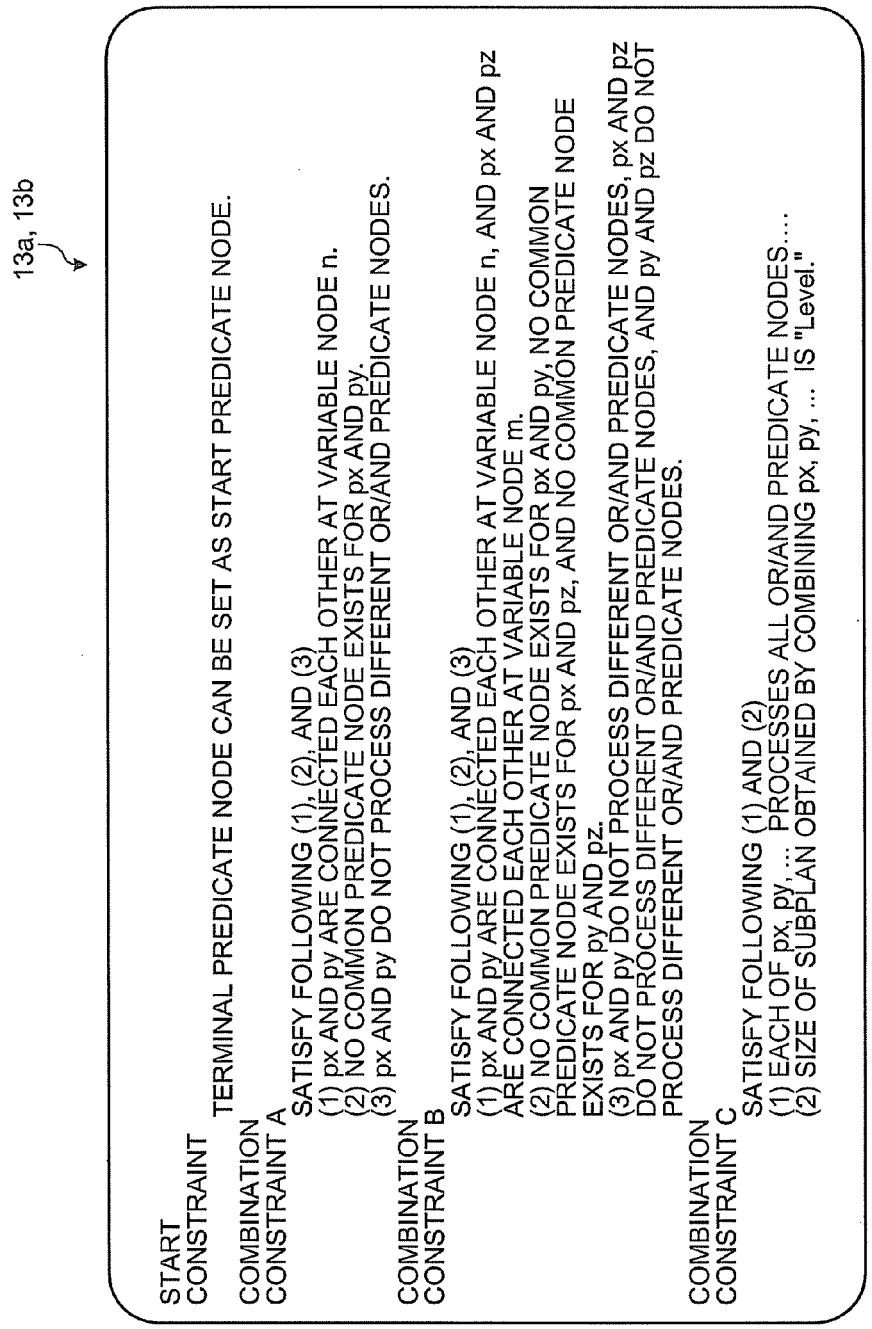
FIG. 7 is a schematic diagram for explaining default plan combination constraint data.

Default plan combination constraint data (a start constraint 13a and a combination constraint 13b) stored in the XQuery constraint storing unit 13 is explained below. FIG. 7 is a schematic diagram for explaining the default plan combination constraint data. The default plan combination constraint data is plan combination constraint data corresponding to each process of the plan combining unit 14, including a start constraint, a combination constraint A, a combination constraint B, and a combination constraint C.

The start constraint shown in FIG. 7 is "terminal predicate node can be set as start predicate node", which indicates a constraint meaning that a start of a subplan is from a terminal predicate node.

The combination constraint A shown in FIG. 7 satisfies following (1), (2), and (3) in the two-subplan combining unit 14a.

(1) px and py are connected each other at variable node n.
(2) no common predicate node exists for px and py.
(3) px and py do not process different OR/AND predicate nodes.

From among the above (1), (2), and (3), (1) indicates a constraint that px and py are adjacent to each other, (2) indicates a constraint that already processed predicated node is not processed repeatedly, and (3) indicates a constraint that OR/AND processes are performed independently and not processed at the same time. It is because that each of the OR/AND processes is to be performed separately and a logical sum (UNION) of results is to be taken.

The combination constraint B shown in FIG. 7 satisfies following (1), (2), and (3) in the three-subplan combining unit 14b.

(1) px and py are connected each other at variable node n, and px and pz are connected each other at variable node m.
(2) no common predicate node exists for px and py, no common predicate node exists for px and pz, and no common predicate node exists for py and pz.
(3) px and py do not process different OR/AND predicate nodes, px and pz do not process different OR/AND predicate nodes, and py and pz do not process different OR/AND predicate nodes.

From among the above (1), (2), and (3), (1) indicates a constraint that py and pz are adjacent to each other via px, (2) indicates a constraint that already processed predicated node is not processed repeatedly, and (3) indicates a constraint that OR/AND processes are performed independently and not processed at the same time. It is because that each of the OR/AND processes is to be performed separately and a logical sum (UNION) of results is to be taken. As for (2) and (3), they are the same as (2) and (3) of the combination constraint A.

The combination constraint C shown in FIG. 7 satisfies following (1) and (2) in the N-subplan combining unit 14c.

(1) Each of px, py, . . . processes all OR/AND predicate nodes.
(2) Size of subplan obtained by combining px, py, . . . is "Level".

As described above, according to the present embodiment, it is enough that only a declaratory constraint condition is added to the background knowledge in advance, and it is not necessary to think about an interference such as a rule. Furthermore, it is not necessary to generate an exhaustive rule.

Figure 8:
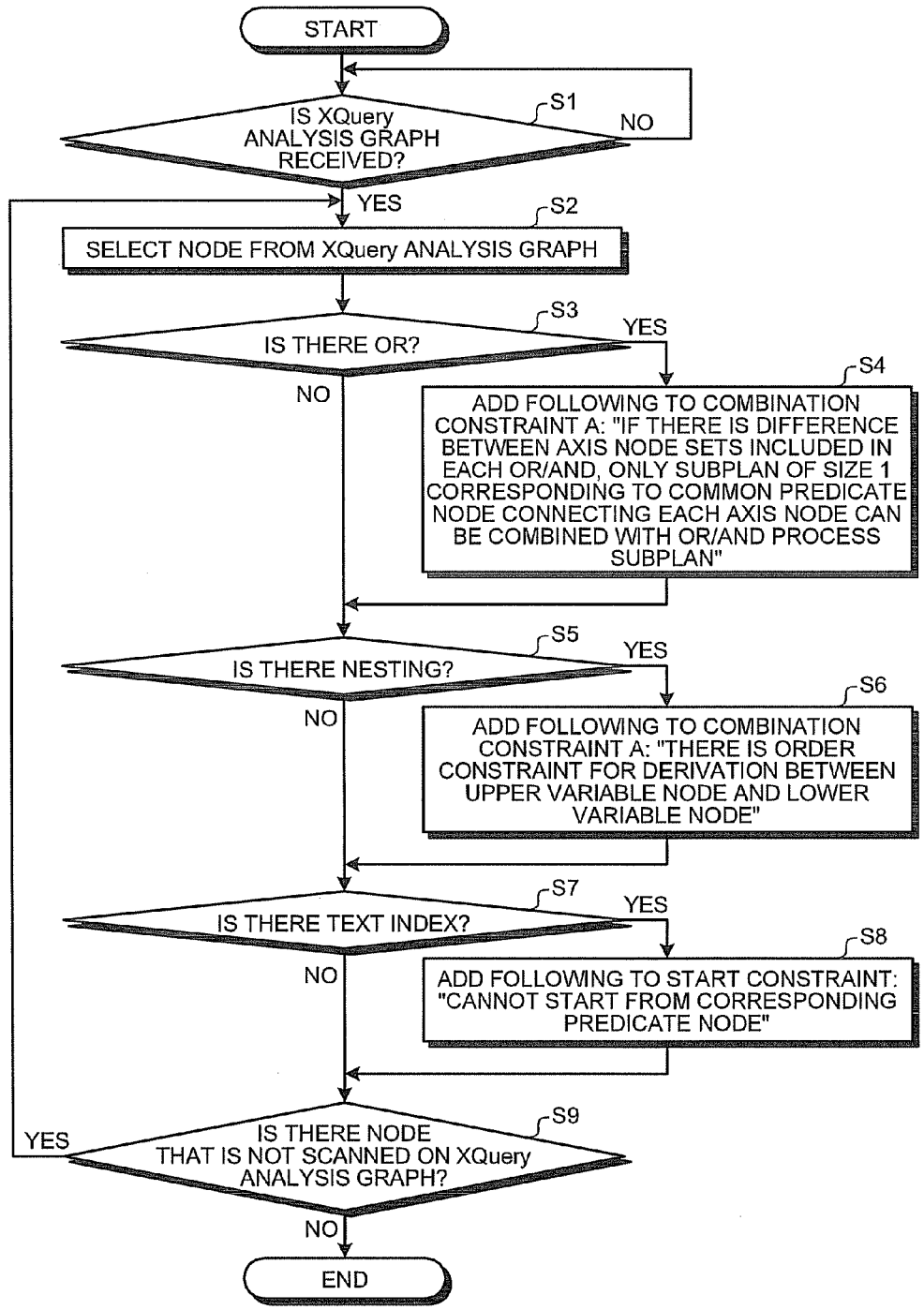
FIG. 8 is a flowchart of a processing procedure for a constraint data extracting process.

The constraint data extracting process performed by the XQuery constraint extracting unit 12 is explained below. FIG. 8 is a flowchart of a processing procedure for the constraint data extracting process performed by the XQuery constraint extracting unit 12. As shown in FIG. 8, upon receiving the XQuery analysis graph generated by the XQuery analyzing unit 11 (Yes at Step S1), the XQuery constraint extracting unit 12 selects a node from the XQuery analysis graph (Step S2).

When there is a meta node indicating an OR (Yes at Step S3), "If there is difference between axis node sets included in each OR/AND, only subplan of size 1 corresponding to common predicate node connecting each axis node can be combined with OR/AND process subplan" is added to the combination constraint A of the plan combination constraint data, and updates the XQuery constraint storing unit 13 (Step S4). The reason why such plan combination constraint data is added is as follows.

The logical expression that can describe a "where" clause is assumed to be normalized in a product-sum format. When processing an OR, a sum set (UNION) of a process result of each logical product (AND expression) can be taken. However, if each logical product is performed for a different axis variable, there is a possibility that each process result does not have the same data structure. In this case, a constraint should be added in order to match the data structure of each process result.

When there is a meta node indicating a nesting (Yes at Step S5), "There is order constraint for derivation between upper variable node and lower variable node" is added to the combination constraint A of the plan combination constraint data, and the XQuery constraint storing unit 13 is updated (Step S6). The reason why such plan combination constraint data is added is as follows.

When processing a "let" clause, there are some points to take care of. An explanation is given by referring to the XQuery data shown in FIG. 5. Although the condition is "There is a book element just below the root element, just below which a title element exists, and the text data of the title element is "XML", the book element does not necessarily have a title element as the child element, and even if there is a title element, it is not necessarily to be equal to "XML". The $title variable in that case becomes an empty sequence { }. In this manner, a loop designated by a "For" clause is not bound to a "let" clause. If one is not very careful about this point, an erroneous result will be output. Therefore, an order constraint for derivation is set for $book and subsequent "let" clause in order to avoid an error.

When the predicative node is "="text" and a text index is not attached in the XML database 10 (Yes at Step S7), "Cannot start from corresponding predicate node" is added to a start constraint of the plan combination constraint data, and the XQuery constraint storing unit 13 is updated (Step S8). The addition of such plan combination constraint data indicates that, because there is no text index, there should not be a subplan starting from it.

The processes at Steps S2 to S8 described above are repeated until it is determined that there is no node that is not scanned on the XQuery analysis graph (No at Step S9).

Figure 9:
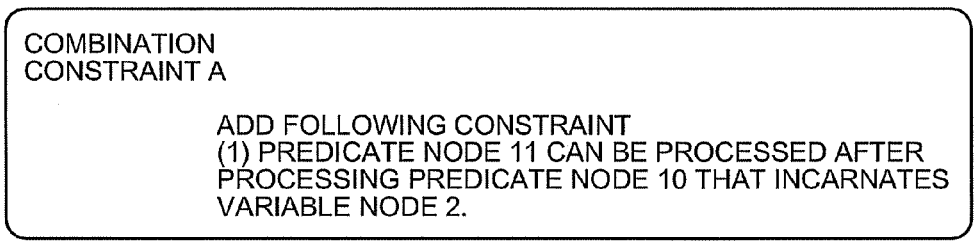
FIG. 9 is a schematic diagram for explaining a supplemental content of a combination constraint A.

FIG. 9 is a schematic diagram for explaining a supplemental content of the combination constraint A, which is a result processed by the XQuery constraint extracting unit 12 with respect to the XQuery analysis graph shown in FIG. 6. Because there is a meta node indicating a nesting in FIG. 6, "There is order constraint for derivation between upper variable node and lower variable node" is added to the combination constraint A. In this example, the upper variable node indicates the "BOOK" variable node [2], and the lower variable node indicates the "TITLE" variable node [3]. It is indicated that the variable node [2] should not be derived after processing the variable node [3]. Namely, it means that the predicate node [11] can be processed after processing the predicate node [10] that incarnates the variable node [2].

As described above, according to the present embodiment, the plan combination constraint data can perform an optimization of a plan including a nesting and a path from a condition that a subplan that processes a logical sum (OR) condition can be combined and a condition that a subplan that processes a nesting (let) clause can be combined.

Figure 10:
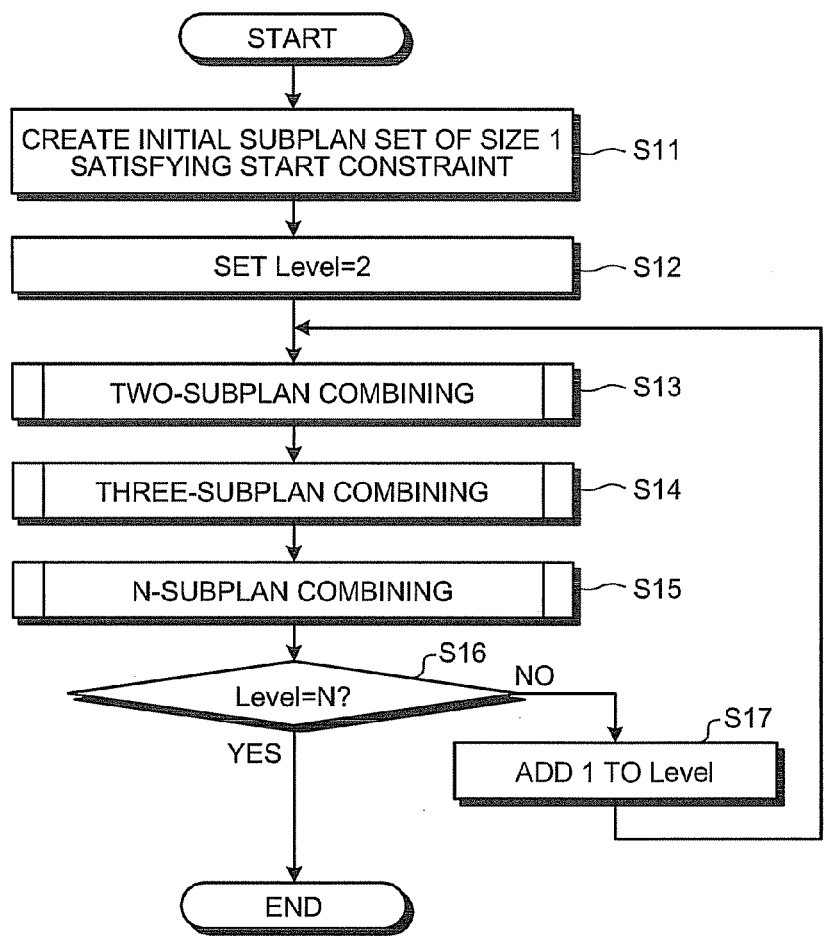
FIG. 10 is a flowchart of a processing procedure for a plan combining process.

Subsequently, a plan combining process performed by the plan combining unit 14 is explained below. FIG. 10 is a flowchart of a processing procedure for the plan combining process performed by the plan combining unit 14. As shown in FIG. 10, the plan combining unit 14 generates a plan for generating the XML data satisfying the XQuery data of a request using the XQuery analysis graph and the plan combination constraint data stored in the XQuery constraint storing unit 13.

As shown in FIG. 10, the plan combining unit 14, after creating an initial subplan set of size 1 satisfying a start constraint (Step S11), and set "Level", which is a variable to be updated or referred to at the plan combining process, to "2" (Step S12). The "Level" is referred to at a process performed by the two-subplan combining unit 14$a$ (Step S13), a process performed by the three-subplan combining unit 14$b$ (Step S14), and a process performed by the N-subplan combining unit 14$c$ (Step S15). The processes of Steps S13 to S15 are repeated by increasing the "Level" by an increment of "1" (Step S17). An end condition is that the "Level" is equal to the number of all predicate nodes constituting the XQuery analysis graph, i.e., "Level=N" (Yes at Step S16). It is a strategy for attaining the final plan by combining the subplans while increasing a size of the subplan step by step.

Figure 11:
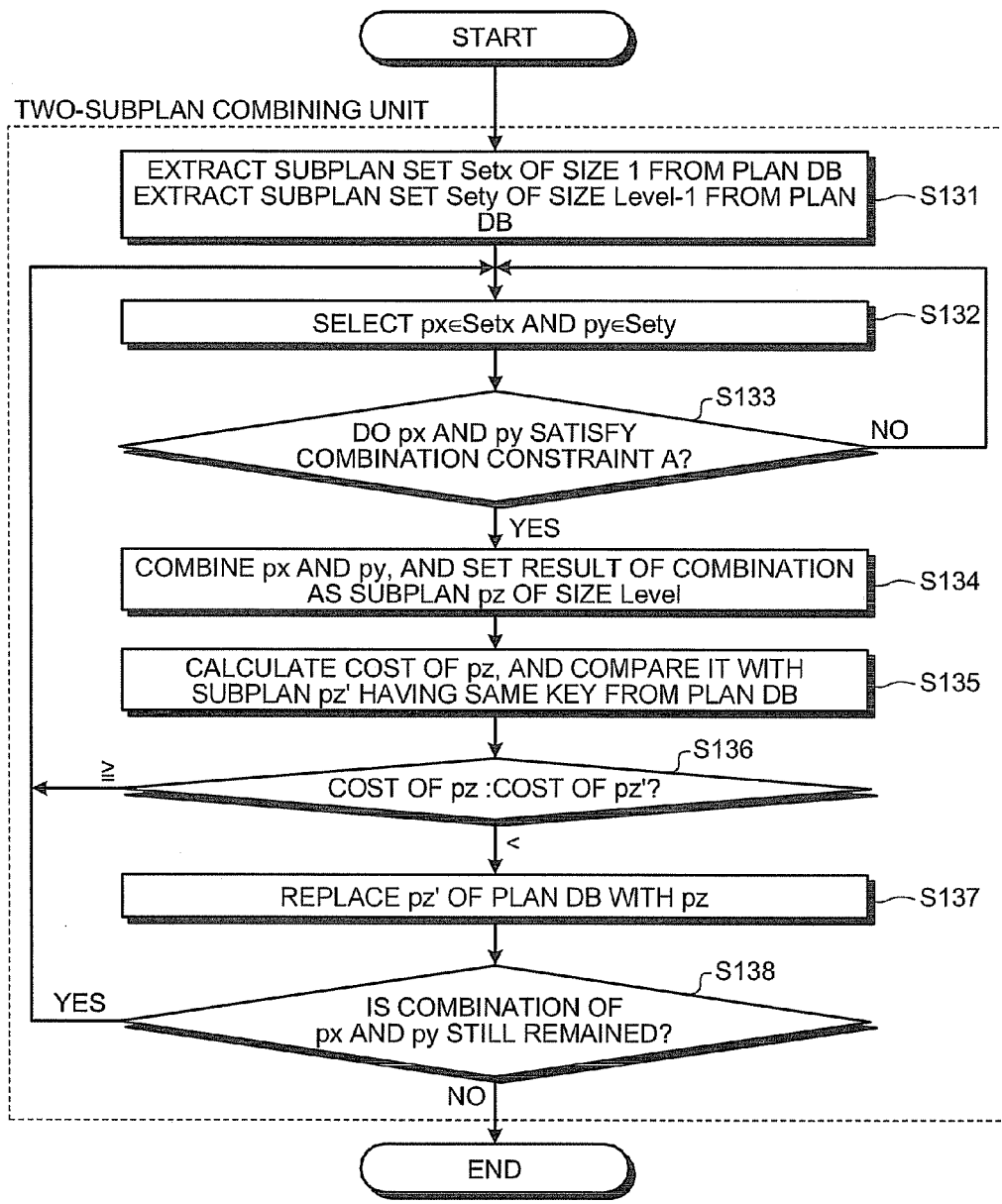
FIG. 11 is a flowchart of a processing procedure for a process performed by a two-subplan combining unit.

A process performed by the two-subplan combining unit 14$a$ at Step S13 is explained by referring to a flowchart shown in FIG. 11. As shown in FIG. 11, the two-subplan combining unit 14$a$ extracts a subplan set Setx of size 1 from a plan DB 20, and at the same time, extracts a subplan set Sety of size Level-1 from the plan DB 20 (Step S131). As explained above, in the plan combining unit 14 combines the subplans while increasing the size of the subplan step by step. A subplan that is generated as an intermediate solution is registered to the plan DB 20 with a key featuring the subplan. The key of the subplan is a predicate set that is processed by the subplan and a size of the predicate set.

At this time, attaining to the size of the Level means that the subplan of the size 1 and the subplan of the size Level-1 surely exist.

At step S132, px∈nSetx and py∈Sety are selected. More specifically, an arbitrary px of the size 1 is selected from the Setx, and an arbitrary py of the size Level-1 is selected from the Sety.

When it is determined that px and py satisfy the combination constraint A (Yes at Step S133), px and py are combined together, and a result of the combination is set as pz of the size Level (Step S134). On the plan, following two interpretations will be performed.

The first interpretation is to enclose px from py as a starting point. For example, an operation to trace the path of the XML data corresponds to the first interpretation. It corresponds to a case of performing a downstream scanning (Descendant) of tracing down to an element from the root element and a downstream scanning (Descendant) of further tracing down a deeper element from the element. For example, it corresponds to an upstream scanning (Ancestor) of an element from a text index (Index) in a plan sequence at the top left of FIG. 14.

The second interpretation is to combine (JOIN) results of px and py. For example, it corresponds to a case of joining results of two text index processes (Index).

At step S135, a cost of pz is calculated, and it is compared with a subplan pz' that has the same key from the plan DB 20.

The cost calculation at the stage of planning is merely an estimation. Although there are various definitions for the cost, the intermediate number of cases is used as an example. It is assumed that there is profile data as follows in the XML database 10 in order to estimate the intermediate number of cases.

the number of results of text index, filtering rate
the loading rate on hierarchical structure of lower element viewed from upper element The cost is calculated from a total sum of a cost of each subplan and a processing cost for an operator corresponding to a combination executed last. For example, if the intermediate number of cases of px is 100, the intermediate number of cases of py is 1000, and the intermediate number of cases becomes 200 by combining them, the cost=100+1000+200. Each of the intermediate number of cases is derived from the profile data.

Subsequently, the cost of pz is compared with the cost of pz' (Step S136), and if the cost of pz' is higher than the cost of pz, pz' of the plan DB 20 is replaced by pz (Step S137). Otherwise, the process control is returned to Step S132.

The processes of Steps S132 to S137 are repeated until there is no combination of px and py (No at Step S138).

Figure 12:
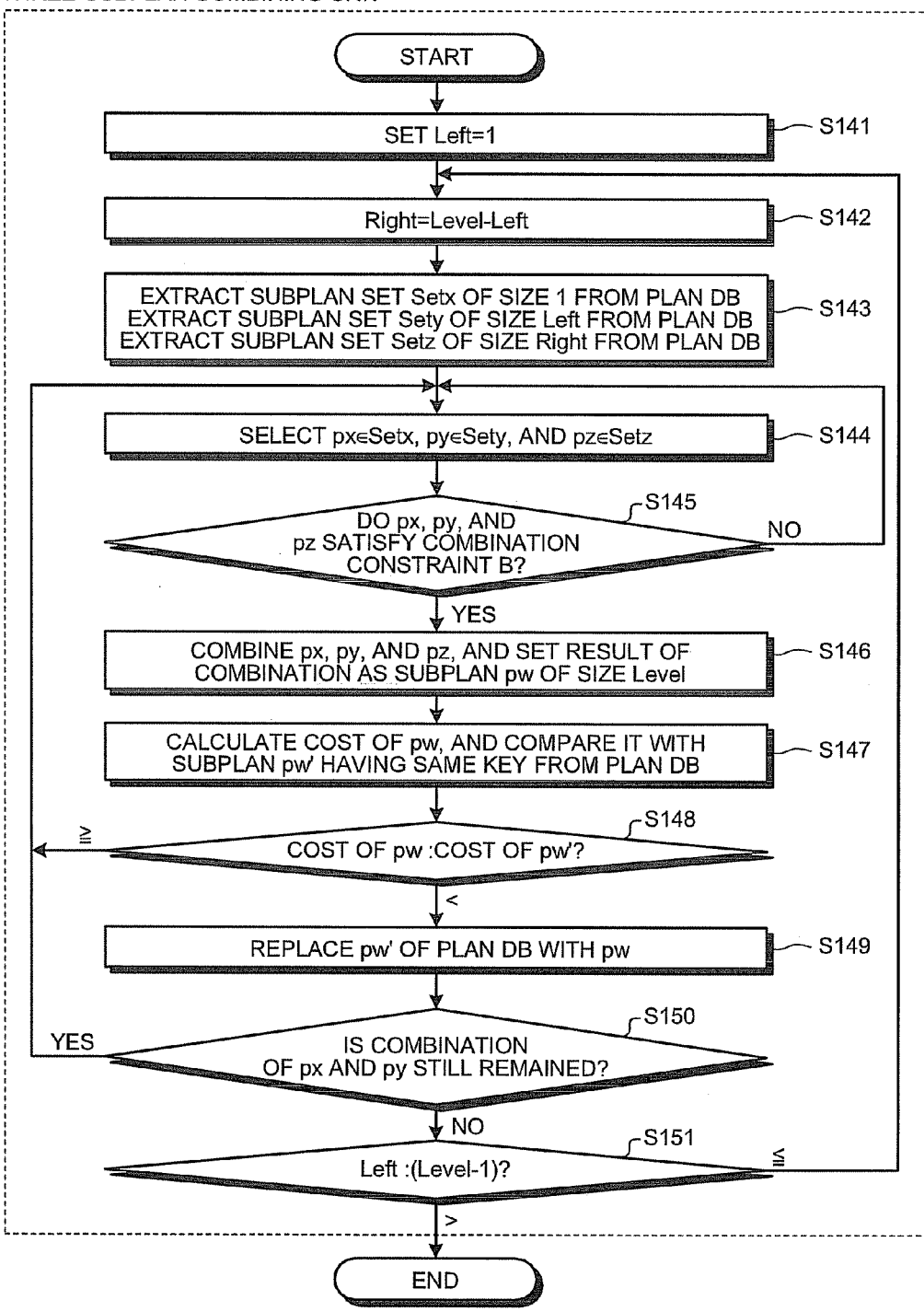
FIG. 12 is a flowchart of a processing procedure for a process performed by a three-subplan combining unit.

A process performed by the three-subplan combining unit 14b at Step S14 is explained by referring to a flowchart shown in FIG. 12. The three-subplan combining unit 14b combines the subplans using three subplans stored in the plan DB 20.

As shown in FIG. 12, the three-subplan combining unit 14b sets Left=1 (Step S141), and sets Right=Level-Left (Step S142).

At step S143, following processes are executed.
extract a subplan set Setx of size 1 from the plan DB 20
extract a subplan set Sety of size Left from the plan DB 20
extract a subplan set Setz of size Right from the plan DB 20

After that, px∈Setx, py∈Sety, and pz∈Setz are selected (Step S144), and then it is determined whether px, py, and pz satisfy the combination constraint B (Step S145). This indicates a constraint that py and pz are adjacent to each other via px.

When it is determined that px, py, and pz satisfy the combination constraint B (Yes at Step S145), px, py, and pz are combined and a result of the combination is set to a subplan pw of size Level (Step S146).

On the other hand, when it is determined that px, py, and pz do not satisfy the combination constraint B (No Step S145), the process control returns to Step S144, and px∈Setx, py∈Sety, and pz∈Setz are selected.

At step S147, a cost of pw is calculated, and it is compared with a subplan pw' that has the same key from the plan DB 20. As a result of the comparison, if the cost of pw' is higher than the cost of pw (at Step S148), pw' of the plan DB 20 is replaced by pw (Step S149). Otherwise, the process control is returned to Step S144, and px∈Setx, Py∈Sety, and pz∈Setz are selected.

The processes of Steps S144 to S149 are repeated until the process is executed for all combinations of px and py (No at Step S150).

If the process is completed for all combinations of px and py (No at Step S150), Left is compared with (Level-1) (Step S151).

The processes of Step S142 to S150 are repeated until Left becomes larger than (Level-1).

Figure 13:
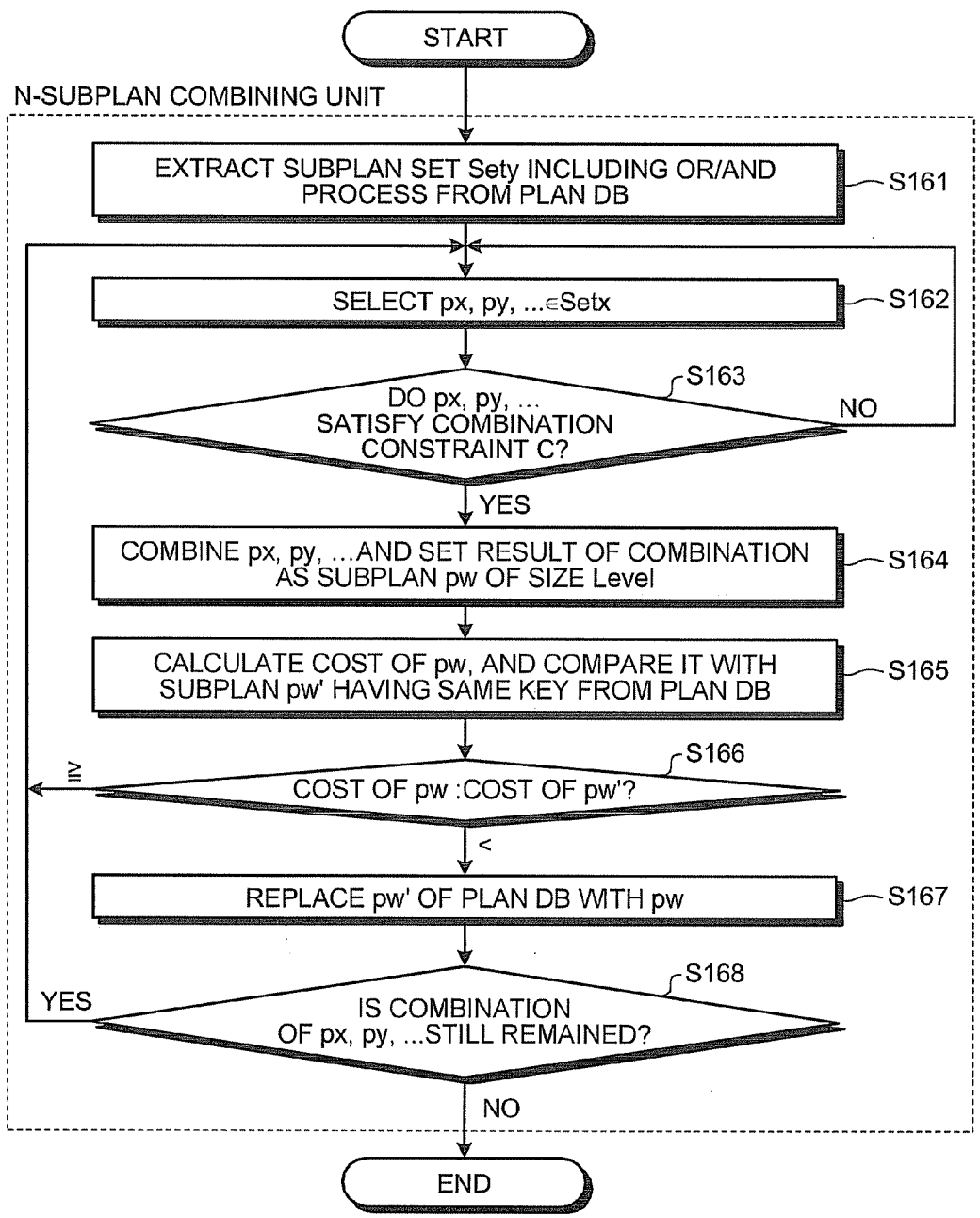
FIG. 13 is a flowchart of a processing procedure for a process performed by an N-subplan combining unit.

A process performed by the N-subplan combining unit 14c at Step S15 is explained by referring to a flowchart shown in FIG. 13. The N-subplan combining unit 14c combines subplans including each OR/AND just below the OR meta node stored in the plan DB 20.

As shown in FIG. 13, the N-subplan combining unit 14c extracts a sub plan set Setx including the OR/AND process from the plan DB 20 (Step S161), and then selects px, py, . . . ∈Setx (Step S162).

Subsequently, it is determined whether px, py, . . . satisfy the combination constraint C (Step S163).

When it is determined that px, py, . . . satisfy the combination constraint C (Yes at Step S163), px, py, . . . are combined together, and a result of the combination is set to a subplan pw of size Level (Step S164).

On the other hand, when it is determined that px, py, do not satisfy the combination constraint C (No at Step S163), the process control returns to Step S162, and px, py, . . . ∈Setx are selected.

At Step S165, a cost of pw is calculated, and it is compared with a subplan pw' that has the same key from the plan DB 20. As a result of the comparison, if the cost of pw' is higher than the cost of pw (at Step S166), pw' of the plan DB 20 is replaced by pw (Step S167). Otherwise, the process control is returned to Step S162, and px, py,. . . ∈Setx are selected.

The processes of Steps S162 to S167 are repeated until all combinations of px and py are processed (No at Step S168).

With the above procedures, the plan combining unit 14 executes the plan combining process.

FIG. 14 is a schematic diagram for explaining an example of a plan that is a result of a processing by the plan combining unit 14 with respect to the XQuery analysis graph shown in FIG. 6 and the combination constraint A shown in FIG. 9. As shown in FIG. 14, there are predicate nodes [12] and [10] as an initial subplan set.

Level=2
A subplan of size 1 corresponding to the predicate node [12] and a subplan of size 1 corresponding to the predicate node [11] are combined by the two-subplan combining unit 14a→Px.

Level=3
The predicate node [10] and Px are combined by the two-subplan combining unit 14a.
In that case, OuterJoin is selected not to limit the upper variable.
Corresponding to the plan [12]: Index (TITLE/text( ), "XML")
Corresponding to the plan [11]: Ancestor (TITLE, BOOK)
Corresponding to the plan [10]: Descendant (DB, BOOK)
OuterJoin (BOOK) is performed at last.

Finally, the plan executing unit 15 generates the XML data satisfying the XQuery data of the request as the result XML data by executing the plan generated by the plan combining unit 14. FIG. 15 is a schematic diagram for explaining the XML data obtained by executing the plan shown in FIG. 14 by the plan executing unit 15.

As described above, according to the present embodiment, because a plan including all predicate nodes is combined by increasing a size of a subplan step by step while selecting the subplan with a low cost using an analysis graph that is expressed by a graph including a variable node corresponding to a variable to which an object on the XML database is bound and a predicate node indicating a condition between the variable nodes and plan combination constraint data that represents a constraint to a plan and a subplan extracted from the analysis graph as a condition between the nodes, it is possible to obtain an optimization of a plan with an even higher accuracy (i.e., the cost).

An embodiment example employing the query processing apparatus 1 is explained below.

Figures 16, 17:
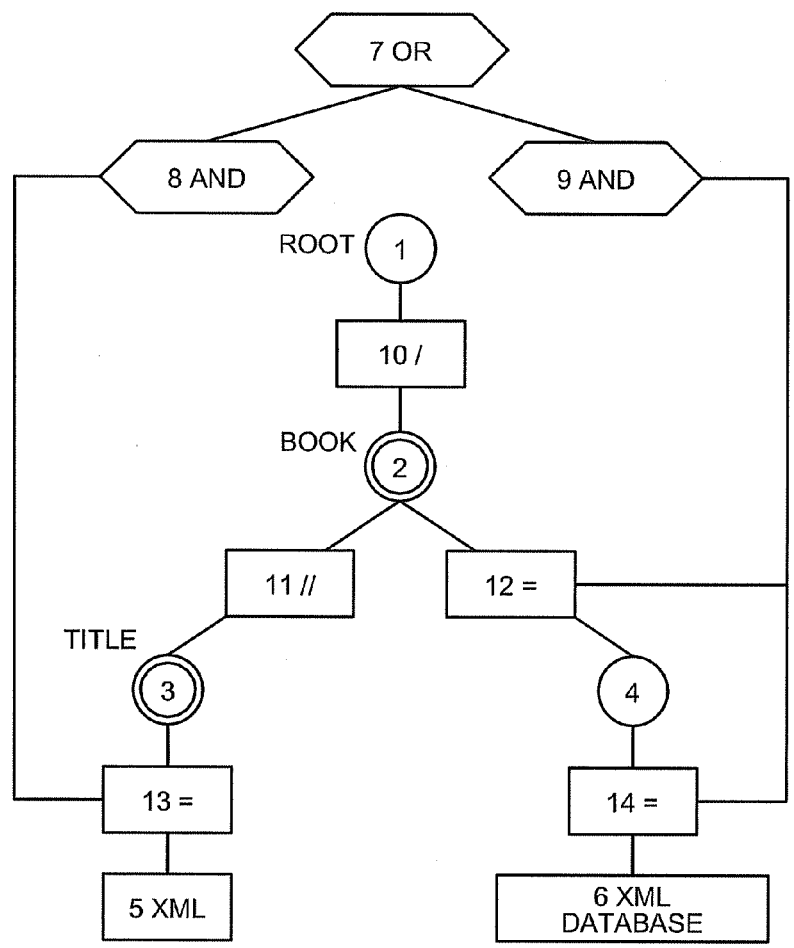
FIG. 16 is a schematic diagram for explaining an example of the XQuery data.
FIG. 17 is a schematic diagram for explaining an XQuery analysis graph generated based on the XQuery data shown in FIG. 16.

FIG. 16 is a schematic diagram for explaining an example of the XQuery data. The XQuery data shown in FIG. 16 indicates a request for "Select the one with a title "XML" or a text portion of a book "XML database" for the book ($book) and the title ($title) just below the root of the XML database, and make a list by enclosing the XML data in which the text of the title and all <BOOK> elements are loaded with a <RESULT> element".

FIG. 17 is a schematic diagram for explaining an XQuery analysis graph generated based on the XQuery data shown in FIG. 16. A condition that constitutes the XQuery data shown in FIG. 16 is as follows.

a condition about the hierarchy between the elements of the XML data
        There is a book element just below the root element (/)
        There is a title element at a grandchild of the book element (//)
        There is a text element just below the title element (/)
        There is an arbitrary element at the grandchild of the book element (//)
    a condition about the text of the XML data
        The text just below the title element is equal to "XML" (=).
        The text just below the arbitrary element that becomes the grandchild of the book element is equal to "XML database" (=)
    information on a "where" clause
        The title is equal to "XML" or the text just below the arbitrary element is equal to "XML database".

Figures 18, 19:
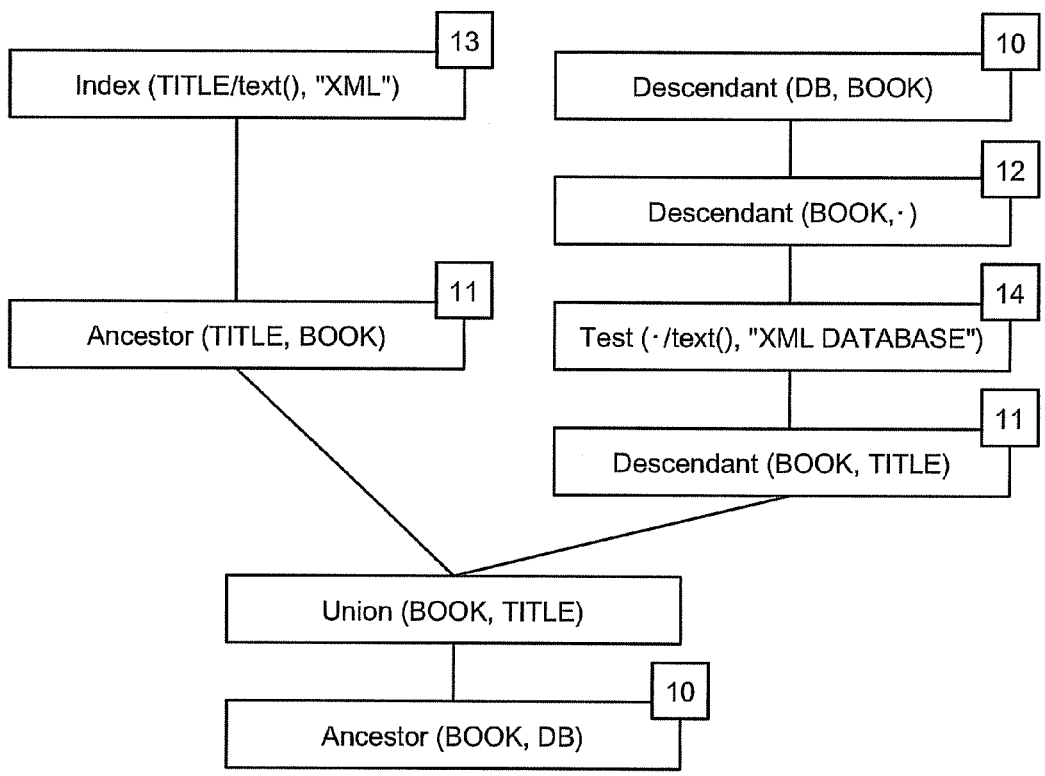
FIG. 18 is a schematic diagram for explaining a supplemental content of the combination constraint A.
FIG. 19 is a schematic diagram for explaining an example of a plan.

FIG. 18 is a schematic diagram for explaining a start constraint that is a result of a processing by the XQuery constraint extracting unit 12 with respect to the XQuery analysis graph shown in FIG. 17 and a supplemental content of the combination constraint A. In FIG. 17, because there is a meta node indicating an OR, following constraint is added to the combination constraint A.

"If there is difference between axis node sets included in each OR/AND, only subplan of size 1 corresponding to common predicate node connecting each axis node can be combined with OR/AND process subplan"

In FIG. 17, an axis node set of an OR/AND [8] is [3] indicating a title element, and an axis node set of an OR/AND [9] is [2] indicating a book element. Because there is a difference between the axis node sets, a common predicate for connecting the axis node sets (i.e., a predicate that has nothing to do with the OR/AND) is selected. In this case, a predicate node [11] is selected. Following constraints are added.

(1) [11] is only predicate node that can be added to OR/AND process subplan including [13].

(2) [11] is only predicate node that can be added to OR/AND process subplan including [12] and [14].

When processing an OR, a sum set (UNION) of a process result of each logical product (AND expression) can be taken. However, if each logical product is performed for a different axis variable, there is a possibility that each process result does not have the same data structure. In that case, a constraint should be added in order to match the data structure of each process result.

In this case, a case is assumed in which the text index is not attached to the title. Because the predicate node is "="TEXT", and the text index is not attached in the XML database, following is added to the start constraint.

(1) A subplan starting from the predicate [14] is invalid.

FIG. 19 is a schematic diagram for explaining an example of a plan that is a result of a processing by the plan combining unit 14 with respect to the XQuery analysis graph shown in FIG. 17 and the combination constraint A shown in FIG. 18. As shown in FIG. 19, there are predicate nodes [13] and [10] as an initial subplan set.

Level=2
    A subplan of size 1 corresponding to the predicate node [13] and a subplan of size 1 corresponding to the predicate node [11] are combined by the two-subplan combining unit 14a→Px.
    A subplan of size 1 corresponding to the predicate node [10] and a subplan of size 1 corresponding to the predicate node [12] are combined by the two-subplan combining unit 14a→Py.
    Level=3
    The predicate node [14] and Px are combined by the two-subplan combining unit 14a→Pz.
    Level=4
    The predicate node [11] and Pz are combined by the two-subplan combining unit 14a.
    Level=5
    pz and px are combined by the N-subplan combining unit 14c.

A UNION operator is used to obtain a sum set.
    Corresponding to the plan [13]: Index (TITLE/text( ), "XML")
    Corresponding to the plan [11]: Ancestor (TITLE, BOOK)
    Corresponding to the plan [10]: Descendant (DB, BOOK)
    Corresponding to the plan [12]: Descendant (BOOK, •)
    Corresponding to the plan [14]: Test (•/text( ), "XML DATABASE")
    Because a variable node [4] is obtained, it becomes Test.
    Corresponding to the plan [11]: Descendant (BOOK, TITLE)
    Corresponding to the plan [10]: Ancestor (BOOK, DB)

Figures 20, 21:
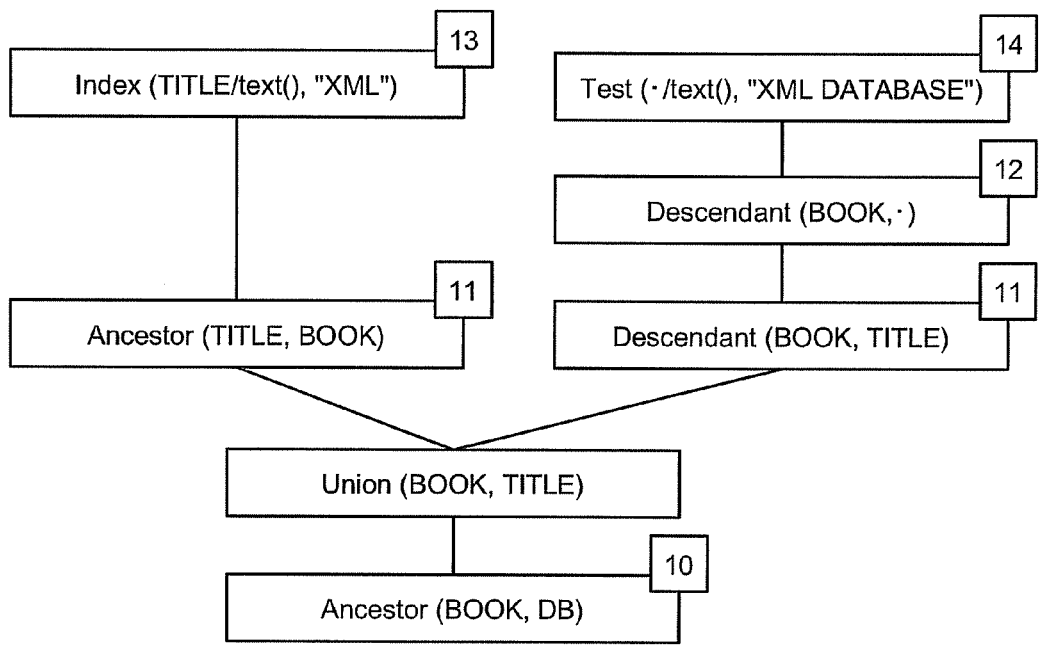
FIG. 20 is a schematic diagram for explaining the XML data obtained by executing the plan shown in FIG. 19.
FIG. 21 is a schematic diagram for explaining an example of a plan according to a second embodiment of the present invention.

FIG. 20 is a schematic diagram for explaining the XML data obtained by executing the plan shown in FIG. 19 by the plan executing unit 15.

Next, a second embodiment is explained below. FIG. 21 is a schematic diagram for explaining an example of a plan, according to a second embodiment of the present invention, that is a result of a processing by the plan combining unit 14 with respect to the XQuery analysis graph shown in FIG. 17 and the combination constraint A shown in FIG. 18.

In the second embodiment, the input XQuery is the one such as the XQuery shown in FIG. 16, which is the same as the former example. However, the current example is different from the former example in that it is assumed that the text index is attached to the title. Because the predicate node is "="TEXT", and the text index is attached in the XML database, following is not added to the start constraint.

(1) A subplan starting from the predicate [14] is invalid.

As shown in FIG. 21, there are predicate nodes [13] and [14] as an initial subplan set.

Level=2
    A subplan of size 1 corresponding to the predicate node [13] and a subplan of size 1 corresponding to the predicate node [11] are combined by the two-subplan combining unit 14a→Px.
    A subplan of size 1 corresponding to the predicate node [14] and a subplan of size 1 corresponding to the predicate node [12] are combined by the two-subplan combining unit 14a→Py.

Level=3

The predicate node [11] and Py are combined by the two-subplan combining unit 14a→Pz.

Level=5 pz and px are combined by the N-subplan combining unit 14c.

A UNION operator is used to obtain a sum set.

Even when the input is the same XQuery, if a condition such as an index setting of the XML database 10 is different, the plan is changed as shown in FIGS. 19 and 21.

FIG. 22 is a schematic diagram for explaining the XML data obtained by executing the plan shown in FIG. 21 by the plan executing unit 15.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A query processing apparatus comprising:
   a query receiving unit that receives query data used for delivering a command to extract structured-document data that satisfies a predetermined condition with respect to a database that stores the structured-document data represented by tree-structured nodes, the query data including an OR/AND condition and a nesting condition;
   a query analyzing unit that parses the query data, and generates an analysis graph that includes variable nodes and predicate nodes, each variable node corresponding to a variable to which an object on the database is bound, each predicate node being connected to the variable nodes, and the predicate node indicating a condition between the connected variable nodes;
   a plan storing unit that stores a plurality of subplans, each of the subplans including at least one of the predicate nodes;
   a plan combining unit that generates a plan including all predicate nodes included in the analysis graph by repeating a combining process, the combining process including:
      a first process that selects from the plan storing unit the plurality of subplans that satisfy plan combination constraint data and that have a low cost; the plan combination constraint data including a first constraint and a second constraint, the first constraint indicating that the predicate nodes included in the plurality of subplans are connected with each other at the variable node, the second constraint indicating that no common predicate node exists in the plurality of subplans, the first process selecting the plurality of subplans that satisfy the first constraint and selecting the plurality of subplans that satisfy the second constraint;
      a second process that generates a new subplan by combining the selected subplans; and
      a third process that stores the generated subplan in the plan storing unit,
   a plan executing unit that generates the structured-document data satisfying the query data by executing the plan; and
   a processor for executing at least the plan combining unit.

2. The apparatus according to claim 1, further comprising a constraint storing unit that stores default plan combination constraint data corresponding to the combining process of the plan combining unit, and
   a constraint extracting unit that extracts the plan combination constraint data from the analysis graph, and updates the default plan combination constraint data stored in the constraint storing unit based on the extracted plan combination constraint data.

3. The apparatus according to claim 1, wherein the plan combining unit includes an arbitrary number of subplan combining unit that generates a new subplan by combining an arbitrary number of subplans.

4. The apparatus according to claim 2, wherein the plan combination constraint data extracted by the constraint extracting unit is a condition of combining a subplan that processes a logical sum condition.

5. The apparatus according to claim 2, wherein the plan combination constraint data extracted by the constraint extracting unit is a condition of combining a subplan that processes a nesting clause.

6. The apparatus according to claim 1, wherein the plan combining unit includes two subplan combining units or more.

7. The apparatus according to claim 2, wherein the constraint storing unit includes a start constraint and a combination constraint.

8. The apparatus according to claim 1, wherein the plan combination constraint data including a constraint of the variable node that is connected to three subplans and a constraint between the plurality of the predicate nodes that correspond to the three subplans.

9. A computer program product having a computer readable medium including programmed instructions for executing a query process, wherein the instructions, when executed by a computer, cause the computer to perform:
   receiving query data used for delivering a command to extract structured-document data that satisfies a predetermined condition with respect to a database that stores the structured-document data represented by tree-structured nodes, the query data including an OR/AND condition and a nesting condition;
   parsing the query data, and generating an analysis graph that includes variable nodes and predicate nodes, each variable node corresponding to a variable to which an object on the database is bound, each predicate node being connected to the variable nodes, and the predicate node indicating a condition between the connected variable nodes;
   generating a plan including all predicate nodes included in the analysis graph by repeating a combining process, the combining process including:
      a first process that selects from a plan storing unit a plurality of subplans that satisfy plan combination constraint data and that have a low cost, the plan combination constraint data including a first constraint and a second constraint , the first constraint indicating that the predicate nodes included in the plurality of subplans are connected with each other at the variable node, the second constraint indicating that no common predicate node exists in the plurality of subplans, the first process selecting the plurality of subplans that satisfy the first constraint and selecting the plurality of subplans that satisfy the second constraint;
      a second process that generates a new subplan by combining the selected subplans; and a third process that stores the generated subplan in the plan storing unit, the plan storing unit storing a plurality of subplans, each of the subplans including at least one of the predicate nodes; and generating the structured-document data satisfying the query data by executing the plan.

10. A query processing method comprising:

receiving query data used for delivering a command to extract structured-document data that satisfies a predetermined condition with respect to a database that stores the structured-document data represented by tree-structured nodes, the query data including an OR/AND condition and a nesting condition;

parsing the query data, and generating an analysis graph that includes variable nodes and predicate nodes, each variable node corresponding to a variable to which an object on the database is bound, each predicate node being connected to the variable nodes, and the predicate node indicating a condition between the connected variable nodes;

generating, using a processor, a plan including all predicate nodes included in the analysis graph by repeating a combining process, the combining process including:

a first process that selects from a plan storing unit a plurality of subplans that satisfy plan combination constraint data and that have a low cost, the plan combination constraint data including a first constraint and a second constraint, the first constraint indicating that the predicate nodes included in the plurality of subplans are connected with each other at the variable node, the second constraint indicating that no common predicate node exists in the plurality of subplans, the first process selecting the plurality of subplans that satisfy the first constraint and selecting the plurality of subplans that satisfy the second constraint;

a second process that generates a new subplan by combining the selected subplans; and a third process that stores the generated subplan in the plan storing unit, the plan storing unit storing the plurality of subplans, each of the subplans including at least one of the predicate nodes; and generating the structured-document data satisfying the query data by executing the plan.

* * * * *